(12) United States Patent
Posch

(10) Patent No.: US 7,039,133 B2
(45) Date of Patent: May 2, 2006

(54) DATA CARRIER HAVING MEANS FOR SYNCHRONIZATION WITH A RECEIVED DATA STREAM

(75) Inventor: Martin Posch, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 620 days.

(21) Appl. No.: 09/794,981

(22) Filed: Feb. 28, 2001

(65) Prior Publication Data

US 2001/0028691 A1    Oct. 11, 2001

(30) Foreign Application Priority Data

Mar. 3, 2000    (EP)    ................................. 00890067

(51) Int. Cl.
*H04L 27/06* (2006.01)

(52) U.S. Cl. ..................................................... 375/340

(58) Field of Classification Search ................ 375/228, 375/340, 342, 356, 354, 359, 364; 711/115, 711/170, 200, 217
See application file for complete search history.

(56) References Cited

U.S. PATENT DOCUMENTS

| 5,115,490 | A | * | 5/1992 | Komuro et al. ............. 711/202 |
| 5,553,095 | A | * | 9/1996 | Engdahl et al. ............. 375/222 |
| 5,790,603 | A | * | 8/1998 | Maeda et al. ............... 375/342 |
| 6,044,421 | A | * | 3/2000 | Ishii ............................ 710/61 |
| 6,608,871 | B1 | * | 8/2003 | Popplewell et al. ........ 375/316 |

* cited by examiner

*Primary Examiner*—Khanh Tran
(74) *Attorney, Agent, or Firm*—Adam L. Stroud

(57) ABSTRACT

A data carrier adapted to receive data (D) in the form of data blocks, which data blocks include delimiter data (SD) and (ED) and useful data (UD), includes delimiter data detection means adapted to detect delimiter data (SD) and (ED) of a data block and to generate and supply at least one useful data start signal (SOF; SOFA, SOFB), in which also after the supply of the useful data start signal (SOF; SOFA) the delimiter data (SD) and (ED) can be re-detected continually and the useful data start signal (SOF; SOFB) can be generated and supplied.

25 Claims, 6 Drawing Sheets

DATA CARRIER HAVING MEANS FOR SYNCHRONIZATION WITH A RECEIVED DATA STREAM

BACKGROUND OF THE INVENTION

The invention generally relates to control of data communication between a data carrier and another device. More particularly, the invention relates to an electric circuit adapted to receive data in the form of data blocks, each data block including delimiter data and useful data, and which includes delimiter data detection means, adapted to detect delimiter data of a data block and to generate and to supply at least one useful data start signal, which at least one useful data start signal can be generated and supplied upon detection of the delimiter data, Such a data carrier and such a circuit have been developed by the applicant and have been put onto the market as an intelligent tag under the name "I•CODE" and are consequently known.

The known data stream has an interface for the contactless communication with an active write/read device. When the known data carrier comes within the communication range of the active write/read device an inductive coupling is established between the write/read device and the data carrier. The power for the operation of the electric circuit of the data carrier is then supplied to the data carrier with the aid of the interface and after an operating voltage has been built up a power-on reset signal is applied to the electric circuit. Furthermore, the data carrier receives a stream of data with the aid of the interface, said data taking the form of data blocks. The data blocks include delimiter data and useful data.

In order to enable the useful data to be utilized in the data carrier the data carrier should first be brought in synchronism with the stream of received data. For this purpose, the data carrier includes data carrier delimiter data detection means, which in an activated state are adapted to detect the delimiter data and to supply a useful data start signal upon such a detection. The delimiter data detection means can be activated by means of a start signal, which is formed by the power-on reset signal in the case of a first activation upon the entry of the data carrier into the communication range of a write/read device. After the detection of the delimiter data the useful data start signal is supplied, upon which the delimiter data detection means are deactivated. This ends a synchronization of the data carrier with the received data.

However, it is be ascertained yet that the synchronization was successful. For this purpose, the data carrier has a data test means adapted to receive the useful data start signal, testing of the received data for data errors being started upon reception of the useful data start signal. The data test means is adapted to supply a data error signal when a data error occurs. When a data error is found during testing of the received data the data test means generate and supply the data error signal and, subsequently, the data test means is deactivated. The presence of the data error signal can have different meanings. On the one hand, it can mean that a transmission error has occurred or that an instruction contained in the useful data is not supported. On the other hand, the occurrence of the data error signal may point towards an incorrect synchronization of the data carrier with the received stream of data.

In the present case, the data error signal forms the start signal for the delimiter data detection means regardless of the meaning of the data error signal, as a result of which the delimiter data detection means are reactivated and a detection of delimiter data is started again. Thus, synchronization of the data carrier is re-started.

In the case of the known data carrier the re-synchronization of the data carrier, which is still within the communication range, is repeated until the data test means no longer detect any data errors. When this situation occurs, i.e. when the data error signal does not appear, the data test means is adapted to supply the useful data to a useful data processing means, upon which the data test means is deactivated.

When in a communication protocol, which defines the time sequence of the stream of data and the contents of the delimiter data and the useful data of the data blocks, suitable measures are taken, such as an unambiguous distinction between the delimiter data and the useful data, i.e. when independence of the communication protocol of the useful data to be communicated is guaranteed, a simple and reliable synchronization of the known data carrier with the stream of data is possible within a foreseeable time interval that is acceptable for the use envisaged for the data carrier.

Even in cases in which there is no unambiguous distinction between the delimiter data and the useful data, i.e. the communication is not independent of useful data to be communicated, the provision of a data block pause between the data blocks which is longer than a maximum pulse spacing between pulses of the useful data also enables a reliable synchronization to be achieved, but this is at the expense of an undesired extension of the communication time.

When the known data carrier uses the communication protocol in accordance with the standard ISO/IEC FDIS 15693-2: 1999(E) for the communication, problems in the synchronization of the data carrier with the stream of data may arise because this communication protocol does not guarantee independence of the communication protocol of the useful data. This is because said standard provides for different delimiter data at the start of a data block (SOF delimiter data) and at the end of a data block (EOF delimiter data), the EOF delimiter data forming a subgroup of the SOF delimiter data. In connection with this communication protocol the problem may arise that with the known data carrier and the known circuit a combination of parts of the useful data adjoining the EOF delimiter data and parts of the EOF delimiter data are erroneously detected as SOF delimiter data, upon which the delimiter data detection means erroneously cause the data test means to start a test, which test inevitably ends up with a new synchronizing process. For two different codings of the data in accordance with the afore-mentioned standard at least 65 combinations may occur, for which in the worst case even no synchronization with the stream of received data is possible.

SUMMARY OF THE INVENTION

It is an object of the invention to preclude the aforementioned problems with an electric circuit, that includes circuit parts of at least one interface, which circuit parts are adapted to receive data (D) in the form of data blocks, each data block including delimiter data (SD) and useful data (UD), and to provide an improved circuit for a data carrier, with which a reliable synchronization with the stream of received data in the data carrier and the circuit for the data carrier is assured even in the case of a communication protocol that is not independent of useful data.

More specifically, the foregoing object may be achieved by providing an electric circuit, that includes circuit parts of at least one interface, which circuit parts are adapted to receive data (D) in the form of data blocks, each data block including delimiter data (SD) and useful data (UD), and which includes delimiter data detection means, which are, adapted to detect delimiter data (SD) of a data block and to generate and to supply at least one useful data start signal (SOF; SOFA, SOFB), which at least one useful data start signal (SOF; SOFA, SOFB) can be generated and supplied upon detection of the delimiter data (SD), and which includes data test means, which are adapted to test the data (D) for data errors, characterized in that the delimiter data detection means are adapted to continually re-detect the delimiter data (SD) of a data block and to generate and to supply the useful data start signal (SOF; SOFB) also after the supply of the useful data start signal (SOF; SOFA).

Furthermore, the present invention contemplates a data carrier having the aforementioned electric circuit.

As a result of the provision of the aforementioned electric circuit or data carrier, the present invention advantageously achieves a reliable synchronization with the stream of received data in the data carrier and the circuit for a data carrier is guaranteed even in the case of a communication protocol that is not independent of useful data.

The present invention also contemplates that all aforementioned data carriers and electric circuits may include decision means, which during testing, with the aid of the data test means, are adapted to decide on the basis of at least one decision criterion (V, V1, V2) whether the re-detection of the delimiter data (SD) can be terminated, and after fulfillment of the decision criterion the delimiter data detection means are adapted to terminate the detection of the delimiter data (SD), and Accordingly, after the detection of the delimiter data and the start of the test of the useful data the continually repeated detection of the delimiter data can be terminated when it has been ascertained that valid delimiter data of a data block have been detected. A further advantage is obtained in that, after it has been ascertained that valid delimiter data of a data block have been detected, an unnecessary continually repeated detection of the delimiter data is precluded, which ensures that testing of the useful data of the data block in the case of a possible re-detection of delimiter data cannot be interrupted erroneously.

The present invention also contemplates that all aforementioned data carriers and electric circuits may include delimiter data counting means that are adapted to count the re-detected delimiter data (SD) and to supply a delimiter data count (BZ), which delimiter data count (BZ) represents a number of counted re-detected delimiter data (SD), and the decision criterion is formed by the delimiter data count (BZ) represented by the number "1" Accordingly, after the detection of the delimiter data and a first re-detection of the delimiter data the continually repeated detection of the delimiter data is discontinued because valid delimiter data should be available not later than upon the first re-detection and, consequently, a continually repeated detection is pointless. A further advantage is obtained in that a re-detection can be identified comparatively simply because this merely requires the provision of means for counting the detected delimiter data.

The present invention also contemplates that all aforementioned data carriers and electric circuits may include decision means that form parts of the delimiter data detection means.

Accordingly, the delimiter data detection means can decide autonomously about the re-detection of the delimiter data.

The present invention also contemplates that all aforementioned data carriers and electric circuits may include useful data pulse counting means that are adapted to count pulses included in the useful data (UD) and to supply a useful data pulse count (W), which useful data pulse count (W) represents a number of pulses counted, and a first decision criterion (V1) is formed by the useful data pulse count (W) represented by the number "2". Accordingly, continually repeated detection of the delimiter data can already be discontinued after a second pulse that occurs in the useful data if during the appearance of the second pulse no valid delimiter data are detected with the aid of the delimiter data detection means, because in this case the first pulse and the second pulse already form parts of the useful data of the data block.

The present invention also contemplates that all aforementioned data carriers and electric circuits may include useful data time measurement means, which when the useful data pulse count (W) is represented by the number "1", are adapted to measure a useful data time interval and to generate a useful data time measurement value, which useful data time measurement value represents the measured useful data time interval, and a second decision criterion (V2) is formed by the useful data pulse count (W) represented by the number "1" and by the useful data time measurement value, which represents the measured useful data time interval and which corresponds to a time interval typical of the reception of the delimiter data (SD). Accordingly, continually repeated detection of the delimiter data can already be discontinued after a first pulse that occurs in the useful data and upon expiry of a time interval measured after the appearance of the first pulse, which time interval corresponds to a typical time interval for the reception of the delimiter data, because in this case the first pulse already forms part of the useful data of the data block.

The present invention also contemplates that all aforementioned data carriers and electric circuits may include decision means that are formed with the aid of parts of the delimiter data detection means. Accordingly, the decision means are realized in the simplest possible manner using parts already present in the delimiter data detection means.

The present invention also contemplates that all aforementioned data carriers and electric circuits may include start inhibit means for the data test means, which inhibit means are adapted to receive a data error signal (DE) that can be supplied by the data test means, the data error signal (DE) enabling a data error to be signaled during the test of the data for data errors, and in the absence of the data error signal (DE) being adapted to inhibit the start of the test of the data (D) for data errors with the aid of the data test means. Accordingly, an undesired new and, consequently, erroneous start of the data test means is precluded upon a detection of delimiter data in the useful data during testing of the data for data errors, when no data errors are reported.

The present invention also contemplates that all aforementioned data carriers and electric circuits may include start inhibit means that are formed with the aid of supply inhibit means which are adapted to inhibit, in the absence of the data error signal (DE), a useful data start signal (SOF) which can be supplied substantially directly after the test. Accordingly, erroneous starting of the data test means is prevented by inhibiting the supply of the useful data start signal intended for starting the test of the data for data errors.

The present invention also contemplates that all aforementioned data carriers and electric circuits may include start inhibit means that are formed with the aid of parts of the delimiter data detection means and the data test means. Accordingly, the supply of the useful data start signal intended for starting the test of the data for data errors is inhibited simply, for example, with the aid of a controllable output of the delimiter data detection means, which output is advantageously configured so as to be essentially controllable directly by means of the data error signal.

The present invention also contemplates that all aforementioned data carriers and electric circuits may include start inhibit means that are formed with the aid of reception inhibit means which are adapted to inhibit, in the absence of the data error signal (DE), a useful data start signal (SOF) which can be received substantially directly after the test. Accordingly, erroneous starting of the data test means is achieved by inhibiting the reception of the useful data start signal intended for starting the test of the data for data errors.

The present invention also contemplates that all aforementioned data carriers and electric circuits may include start inhibit means that are formed of parts of the data test means Accordingly, inhibiting the reception of the useful data start signal intended for starting the test of the data for data errors is effected simply, for example, with the aid of a controllable input of the data test means, which input is advantageously configured so as to be essentially controllable directly by means of the data error signal.

The present invention also contemplates that all aforementioned data carriers and electric circuits may include a circuit that takes the form of an integrated circuit. Accordingly, production at the lowest possible cost is guaranteed in the case of suitably large production quantities.

The above-mentioned as well as further aspects of the invention will become apparent from the embodiments described hereinafter by way of example and will be elucidated with reference to these examples.

The invention will now be described in more detail with reference to the drawings, which show some embodiments given by way of example but to which the invention is not limited.

DETAILED DESCRIPTION OF THE INVENTION

Figure 1:
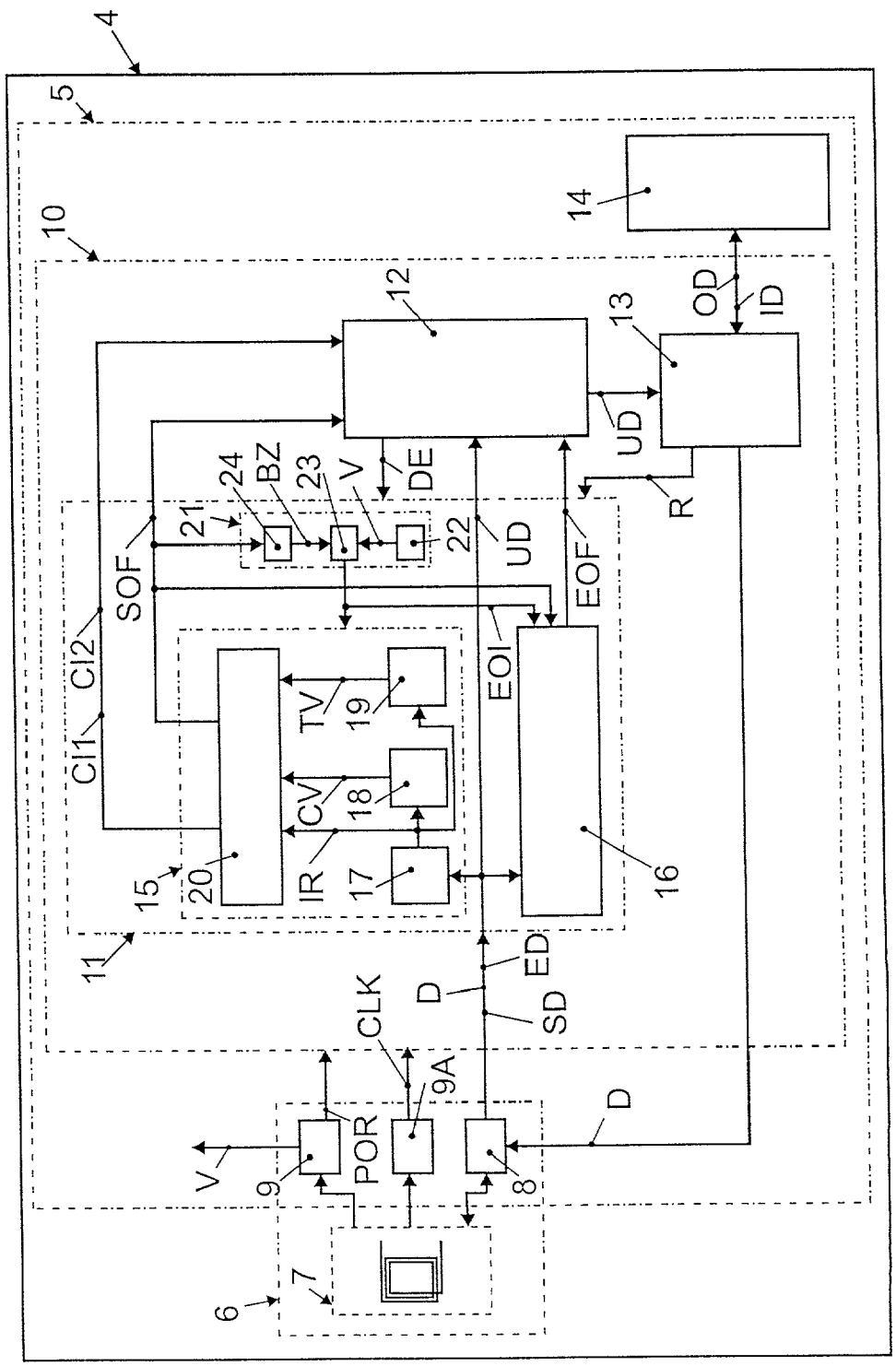
FIG. 1 shows diagrammatically in the form of a block diagram a relevant part of a data carrier and a circuit for a data carrier in a first embodiment of the invention.

FIG. 1 shows a block diagram of a write/read device 1 which serves to and is adapted to provide bidirectional communication of data D in accordance with a communication protocol in accordance with the standard ISO/IEC FDIS 15693-2: 1999(E), i.e. to receive data D from a data carrier and to transmit data D to a data carrier, the reception not being explained hereinafter because it is not relevant for the invention.

For this purpose of transmitting the write/read device 1 has device interface means 2. The device interface means 2 include a first communication coil 3, which communication coil 3 can be energized with a high-frequency carrier signal with the aid of means not shown in FIG. 1. During a transmission of the data D the carrier signal is amplitude modulated in accordance with the data D by modulation means which are neither shown in FIG. 1.

The data to be transmitted are transmitted as a stream D of data, which stream takes the form of data blocks with interposed pauses, each data block including delimiter data SD and ED and useful data UD, which useful data UD are arranged between the delimiter data SD and ED. In accordance with the standard the delimiter data SD preceding the useful data UD, so-called SOF delimiter data SD, can be distinguished from the delimiter data ED following the useful data UD, so-called EOF delimiter data ED, the EOF delimiter data ED forming a sub-group of the SOF delimiter data SD. The useful data UD may contain inter alia instructions and information, in accordance with the standard.

FIG. 1 further shows a block diagram of a data carrier 4 adapted to provide contactless bidirectional communication of the data D with the write/read device 1. For this purpose, the data carrier has an electric circuit 5, which circuit 5 includes circuit parts of at least one interface 6, the circuit parts being adapted both to receive data D in the form of data blocks and to transmit data D in the form of data blocks.

The interface 6 includes a second communication coil 7 and data conversion means 8 and a voltage generator 9 and clock generation means 9A. In the present case, the circuit parts of the at least one interface 6 are formed by the clock generation means 9A, the voltage generator 9 and the data conversion means 8. The circuit parts of the interface 6 are adapted to be energized by the second communication coil 7.

The interface 6 is configured in such a manner that upon entry of the data carrier 4 into the communication range of the write/read device 1 an inductive coupling can be established between the first communication coil 3 and the second communication coil 7. When the inductive coupling exists between the first communication coil 3 and the second communication coil 7 power can be transmitted from the write/read device 1 to the data carrier 4 and, furthermore, the communication of data D between the write/read device 1 and the data carrier 4 is possible with the aid of the interface 6. The interface 6 first of all enables a supply voltage V for the circuit 5 to be generated by the voltage generator 9. At the same time the clock generation means 9A enable a system clock CLK for the data processing means 10 of the circuit 5 to be derived from the received carrier signal and to be supplied to the data processing means 10. When the system clock CLK is stable and the supply voltage V has reached its nominal value, the voltage generator 9 can supply a power-on reset signal POR to the data processing means. Thus, enables the processing of the data to be started in the data processing means 10. The data conversion means 8 are configured in such a manner that they are adapted to receive the modulated carrier signal from the second communication coil 7 during a transmission of data D from the write/read device 1 to the data carrier 4. The data conversion means can convert the received modulated carrier signals into serial digital representations of the data and the data conversion means 8 can supply these to the data processing means 10. During a transmission of data D from the data carrier 4 to the write/read device 1 the data conversion means 8 are adapted to receive the data D from the data processing means 10. In this case, the data conversion means 8 are adapted to effect a load modulation of the carrier signal received by means of the communication coil 7, thus enabling the data D to be transmitted from the data carrier 4 to the write/read device 1.

In addition to the circuit parts of the interface 6 the circuit 5 includes delimiter data detection means 11, data test means 12, useful data processing means 13 and memory means 14. When the data conversion means 8 supply the data D to the data processing means 10 the data can be applied to the delimiter data detection means 11. The delimiter data detection means 11 are adapted to detect the delimiter data SD and ED of a data block and, upon detection of the SOF delimiter data SD, to supply a useful data start signal SOF, which useful data start signal SOF can be generated and supplied upon detection of the delimiter data SD. When the power-on reset signal POR occurs the delimiter data detection means 11 can restart the detection.

The delimiter data detection means 11 include useful data detection means 15 for the detection of a useful data start of useful data included in the data D. The useful data detection means 15 are accordingly adapted to detect the SOF delimiter data SD and, upon detection of the SOF delimiter data SD, to generate and supply the useful data start signal SOF.

In the present case, the useful data detection means 15 are further adapted to detect the coding type of the data D during the detection of the SOF delimiter data SD. In the present case, a first coding type and a second coding type can be detected. When the first coding type is detected the useful data detection means 15 are adapted to generate and supply first coding information CI1 to the data test means 12.

The delimiter data detection means 11 are further adapted to receive a data error signal DE, in response to the reception of which data error signal DE a new detection of the SOF delimiter data SD in the data D can be started.

Moreover, the delimiter data detection means 11 are adapted to receive a ready-to-receive signal R and upon the reception of the ready-to-receive signal R the delimiter data detection means 11 can re-start the detection of delimiter data SD and ED.

The delimiter data detection means 11 further include useful data end detection means 16 for detecting a useful data end of the useful data UD included in the data D. The useful data end detection means 16 are therefore adapted to detect the EOF delimiter data ED and, upon detection of the EOF delimiter data ED, to generate and supply the useful data end signal EOF. The useful data detection means 16 are further adapted to receive the useful data start signal SOF, so as to enable the detection of the EOF delimiter data ED to be started when the useful data start signal SOF is received.

The data test means 12 are adapted to receive the data D, the useful data start signal SOF, the first coding information CI1, the second coding information CI2 and the useful data end signal EOF. The data test means 12 are further adapted to test the useful data UD included in the data D. The data test means are such that testing of the useful data UD included in the data D can be started after reception of the useful data start signal SOF. During this test it is determined, for example, whether a code violation can be found in the useful data UD on the basis of the received first coding information CI1 or the received second coding information CI2, or whether the useful data UD include instructions not present in an instruction set of the data processing means 10. During testing a data error can be detected, the data test means 12 being adapted to supply the data error signal DE to the delimiter data detection means 11 upon detection of the data error.

The data test means 12 subsequently stop testing of the data D for data errors, until testing of the data D for data errors is re-started with the aid of the useful data start signal SOF. However, testing by the data test means 12 can also be terminated upon reception of the useful data end signal EOF. The data test means 12 are adapted to supply the useful data UD to the useful data processing means 13 when no data error signal DE appears, i.e. in the case of error-free useful data UD, and when the useful data end signal EOF is received.

The useful data processing means 13 are adapted to process the useful data UD, i.e. to carry out instructions contained in the useful data UD. With the aid of the instructions the useful data processing means 13 can carry out arithmetic operations or they can also be enabled to access the memory means 14. During access to the memory means 14 it is possible, for example, to load information included in the useful data UD into the memory means 14 as entry data ID. However, information stored in the memory means 14 can be read from the memory means 14 as output data OD, which output data OD can be supplied from the useful data processing means 13 to the data conversion means 8 as data D to be transmitted. Furthermore, the useful data detection means 13 are adapted to generate and supply the ready-to-receive signal R during the processing of the useful data UD. The ready-to-receive signal R can be generated, for example, after processing of the useful data UD, as a result of which the detection of the delimiter data SD and ED in the data carrier 4 can be re-started independently of the power-on reset signal POR.

For the detection of the SOF delimiter data SD the useful data detection means 15 includes pulse detection means 17, pulse counting means 18, time measurement means 19 and evaluation means 20. The pulse detection means 17 can receive data D supplied by the data conversion means 8. The pulse detection means 17 are adapted to detect pulses in the data D and to generate and supply a pulse detection signal IR. The pulse detection signal IR can be applied to the evaluation means 20, the pulse counting means 18 and the time measurement means 19. The pulse counting means 10 are adapted to receive the pulse detection signal IR and to count the detected pulses. During counting the pulse counting means are adapted to generate a pulse count CV and to supply this pulse count CV. The pulse count CV can assume the values one and two during counting. The time measurement means 19 are adapted to receive the pulse detection signal IR and to measure the time elapsing between two received pulse detection signals IR. During the measurement of the elapsed time the time measurement means 19 are adapted to generate a time measurement value TV and to supply this time measurement value TV. In the time measurement means 19 the measurement of the elapsed time is effected on the basis of the system clock CLK applied to the data processing means 10. The evaluation means 20 are adapted to receive the pulse detection signal IR, the pulse count CV and the time measurement value TV. The evaluation means 20 are further adapted to evaluate, i.e. to detect, SOF delimiter data SD in the data D on the basis of the pulse detection signal IR, the pulse count CV and the time measurement value TV and to detect the first coding type or the second coding type of the data D. The evaluation means 20 can generate and supply the afore-mentioned first coding information CI1 or the second coding information CI2 as a first preliminary result of the evaluation. Furthermore, the evaluation means 20 can supply and generate the useful data start signal SOF as a second preliminary result of the evaluation.

The detection of the delimiter data SD and ED in the delimiter data detection means 11 is started for the first time by the appearance of the power-on reset signal POR. The useful data detection means 15 included in the delimiter data detection means 11 then start with the detection of the SOF delimiter data SD. The useful data end detection means 16 included in the delimiter data detection means 11 are activated only after detection of the SOF delimiter data SD, i.e. after an appearance of the useful data start signal SOF.

In this respect it has proved to be very advantageous that also after the supply of the useful data start signal SOF, i.e. during the test by the data test means 12, the delimiter data detection means 11 are adapted to continually repeat the detection of the delimiter data SD and ED of a data block and to generate the useful data start signal SOF, i.e. that the useful data start detection means 15 are not deactivated after the detection of the SOF delimiter data SD and the supply of the useful data start signal SOF. This has the major advantage that in the data carrier 4 and in the circuit 5 for the data carrier 4 a reliable synchronization with the data D is assured, even in the case that a combination of parts of the useful data and parts of or the complete EOF delimiter data cannot be distinguished unambiguously from the SOF delimiter data SD, as is possible in the present case with the communication protocol that is not independent of the useful data.

It has further proved to be advantageous for the data carrier 4 that decision means 21 are provided, which are adapted to decide on the basis of a decision criterion V whether the repeated detection of the delimiter data SD and ED can be terminated during testing with the aid of the data test means 12, and that the delimiter data detection means 11 are adapted to terminate the detection of the delimiter data SD and ED when the decision criterion V is met. For this purpose, the decision means 21 include criterion storage means 22, comparison means 23 and reference data counting means 24.

The criterion storage means 22 are adapted to store the decision criterion V. The comparison means 23 are arranged to receive, on the one hand, the decision criterion V stored in the criterion storage means 22 and, on the other hand, to receive a comparison value. In the case of agreement of the comparison value with the decision criterion V the comparison means 23 can generate a detection end signal EOI and supply this to the useful data start detection means 15 and to the useful data end detection means 16. The delimiter data counting means 24 are adapted to count the newly detected SOF delimiter data SD, i.e. to count the occurrence of the useful data start signal SOF, and to supply a delimiter data count BZ. In the present case, the delimiter data count BZ forms the comparison value to be applied to the comparison means 23. In the present case, the decision criterion V is formed by the delimiter data count BV represented by the number "1". This has the advantage that a continually repeated detection of the delimiter data SD and ED is terminated already after a first re-detection of the SOF delimiter data SD. This is of interest particularly in conjunction with uses in which a reliable and dependable synchronization of the data carrier 4 with the stream of data D is already guaranteed after a first re-detection.

In the present case, the decision means 21 form parts of the delimiter data detection means 11.

In the present case, the data processing means 10 of the data carrier 4 take the form of hard-wired electronic circuitry.

The circuit 5 of the data carrier 4 takes the form of an integrated circuit.

Figure 2:
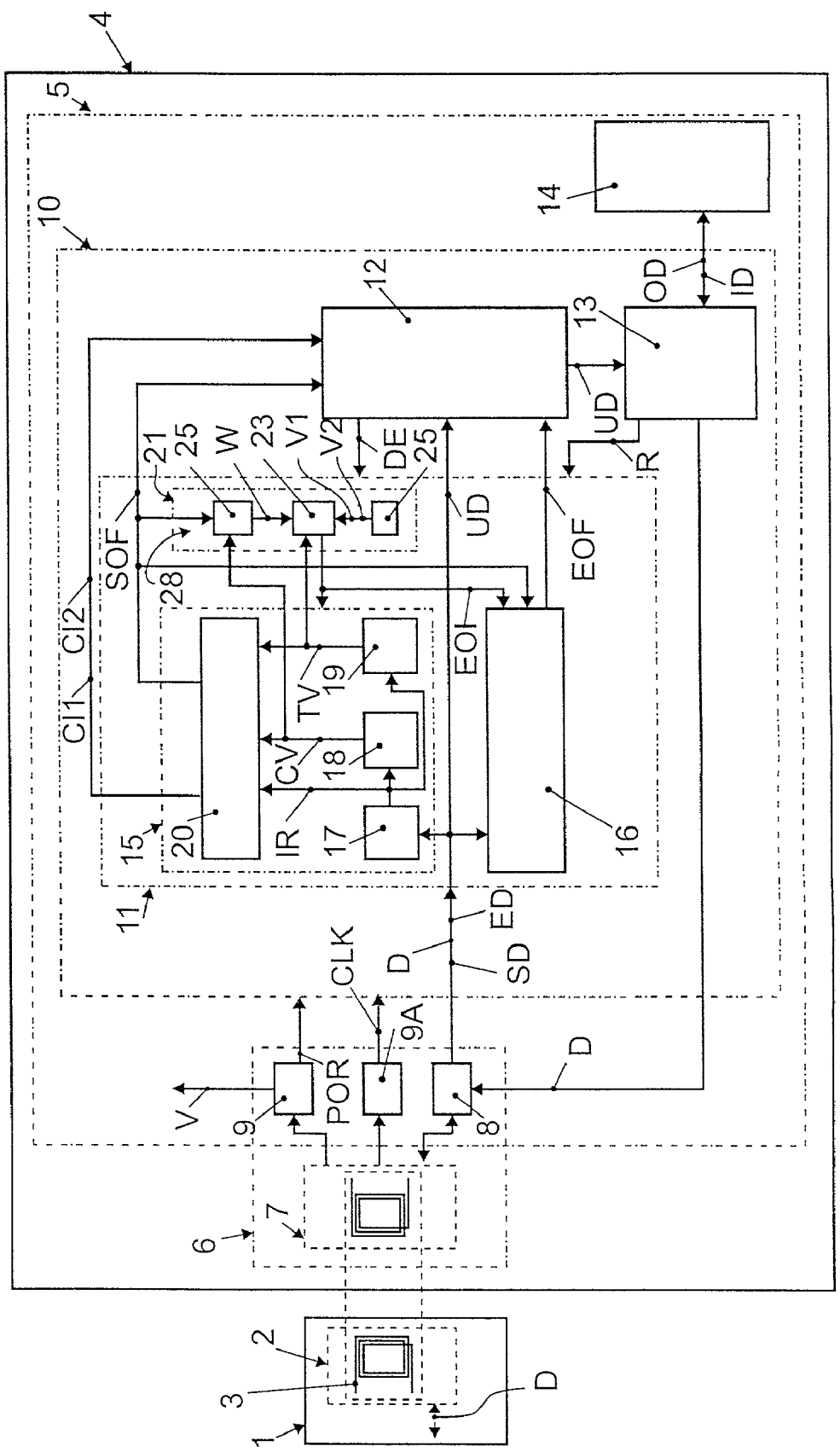
FIG. 2 shows, in a manner similar to FIG. 1, a data carrier and a circuit for a data carrier in a second embodiment of the invention.

FIG. 2 shows a block diagram of a data carrier 1 similar to the data carrier 1 shown in FIG. 1. The data carrier 1 shown in FIG. 2 has decision means 21 similar to the decision means 21 in FIG. 1. The decision means 21 also includes criterion storage means 22 and comparison means 23. In the present case, the criterion storage means 22 are adapted to store a first decision criterion V1 and to store a second decision criterion V2. In the present case, the comparison means 23 are arranged to receive the two decision criteria V1 and V2 and to receive a first comparison value and a second comparison value.

The decision means 21 include useful data pulse counting means 25 adapted to count pulses appearing in the useful data UD. Said pulses are those pulses appearing in the data after the occurrence of the useful data start signal SOF. The useful data pulse counting means 25 are further adapted to supply a useful data pulse count W, which useful data pulse count W is a value representing the number of pulses counted. Accordingly, the useful data pulse counting means 25 are arranged to receive the useful data start signal SOF and to receive the pulse detection signal IR, the useful data pulse counting means 24 being enabled to count the pulse detection signal IR only after reception of the useful data start signal SOF. The useful data pulse count W, which can be supplied to the comparison means 23 by the useful data pulse counting means 25, forms the first comparison value. In the present case, the first decision criterion V1 is formed by the useful data pulse count W represented by the number "2". This has the advantage that the decision means 21 can terminate a detection of the SOF delimiter data SD already after the second pulse appearing in the useful data UD, if no SOF delimiter data have been detected until the appearance of the second pulse.

The data carrier further includes time measurement means 28 which, once the useful data pulse count W has the value "1", is adapted to measure a useful data time interval after the appearance of a first pulse in the useful data UD and to generate a useful data time measurement value, which useful data time measurement value represents the measured useful data time interval. In the present case, the useful data time measurement means 28 for measuring the useful data time interval are configured in such a way that the comparison means 23 are adapted to receive the time measurement value TV supplied by the time measurement means 19 only when the useful data pulse count W has the value "1". The useful data time measurement means 28 are therefore formed with the aid of the comparison means 23, the useful data pulse counting means 25 and the time measurement means 19. In the present case, the second decision criterion is formed by the useful data pulse count W representing the number "1" and by the time measurement value TV, which time measurement value TV corresponds to a time interval which is typical of the reception of the delimiter data. This has the advantage that the re-detection of the SOF delimiter data SD can be terminated already after the first pulse appearing in the useful data UD and expiry of the useful data time interval measured after the appearance of this pulse and corresponding to the time interval typical of the reception of the SOF delimiter data SD, because in this case the first pulse appearing in the useful data UD forms a part of the useful data UD of the data D.

Figure 3:
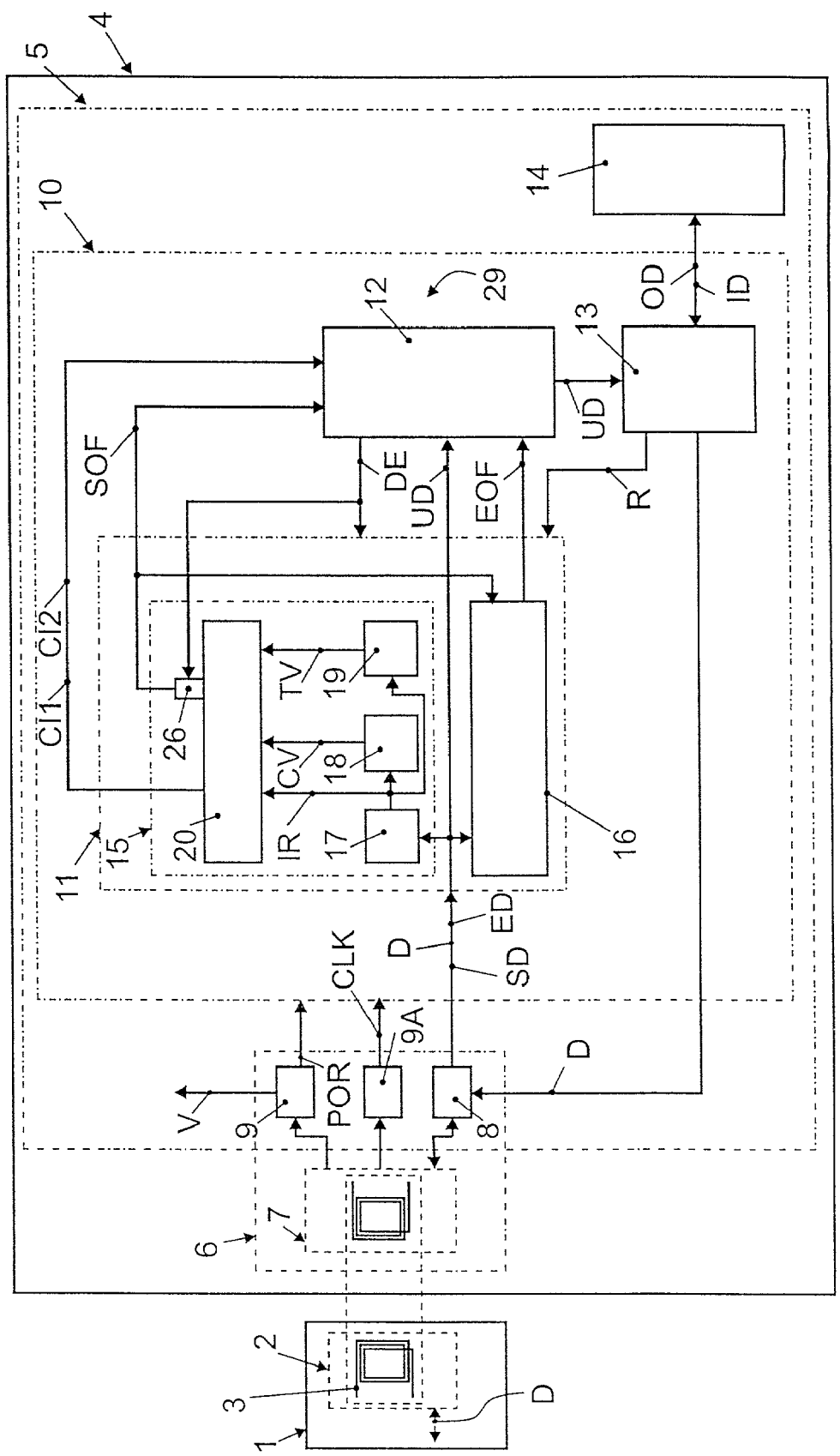
FIG. 3 shows, in a manner similar to FIG. 1, a data carrier and a circuit for a data carrier in a third embodiment of the invention.

FIG. 3 shows a block diagram of a data carrier 4 similar to the data carrier 4 shown in FIG. 1. In contradistinction to the data carrier 4 of FIG. 1 the data carrier 4 of FIG. 4 does not include decision means 21 to decide whether the re-detection of the delimiter data SD and ED can be terminated. The data carrier 4 shown in FIG. 3 includes start inhibit means 29 for the data test means 12, which start inhibit means are adapted to receive a data error signal DE that can be supplied by the data test means 12 and to inhibit the start of the data test for data errors by means of the data test means 12. The start inhibit means 29 are formed with the aid of supply inhibit means 26, which are adapted to inhibit a useful data start signal SOF to be supplied substantially directly after the test. In the data carrier 4 shown in FIG. 3 the supply inhibit means 26 are formed with the aid of a controllable output of the evaluation means 20, which controllable output is arranged to supply the useful data start signal SOF. Instead of the controllable output a control stage, which is separate from the evaluation means 20, may be arranged after the output of the evaluation means 20. In the present case, the start inhibit means 29 are formed with the aid of parts of the delimiter data detection means 11, namely by the controllable output of the evaluation means 20, which is used as a supply inhibit means 26, and consequently by a part of the evaluation means 20, and with the aid of the data test means 12, since the supply inhibit means 26 are adapted to cooperate with the data test means 12.

As a result of the provision of the start inhibit means 29 it is advantageously achieved that the continual re-detection of the SOF delimiter data SD is not interrupted while at the same time erroneous starting of the data test means is precluded.

Figure 4:
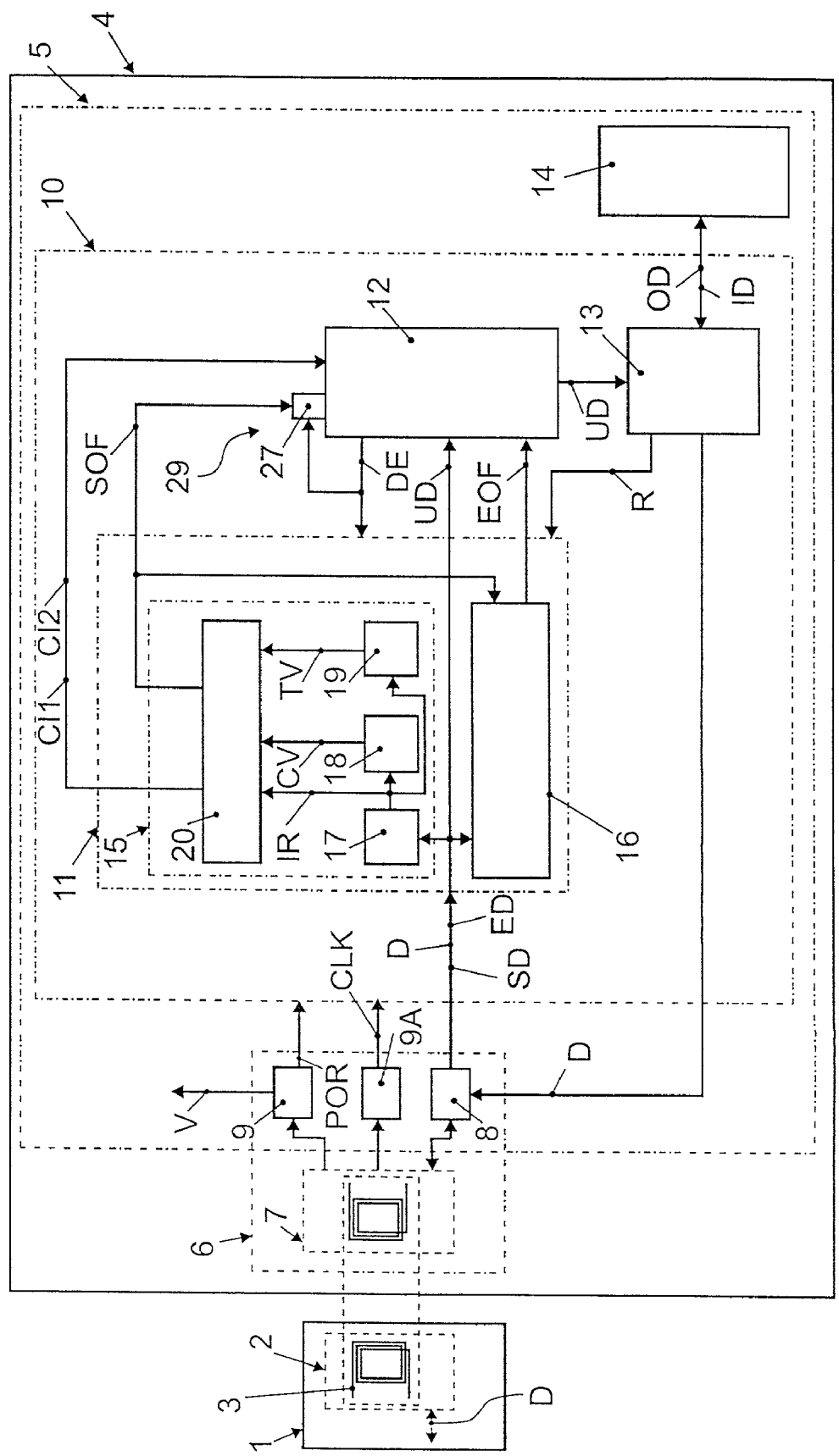
FIG. 4 shows, in a manner similar to FIG. 1, a data carrier and a circuit for a data carrier in a fourth embodiment of the invention.

FIG. 4 shows a block diagram of a data carrier 4 similar to the data carrier 4 shown in FIG. 1 and, like the data carrier 4 shown in FIG. 3, having no decision means. However, the data carrier 4 shown in FIG. 4 also has start inhibit means 29, which start inhibit means 29 are formed with the aid of reception inhibit means 27, which in the absence of the data error signal DE, are adapted to inhibit a useful data start signal SOF, which is receivable substantially directly after testing. The reception inhibit means 27 are formed with the aid of a controllable input of the data test means 12, which controllable input is arranged to receive the useful data start signal SOF. Instead of the controllable input it is alternatively possible to arrange a control stage, which is separate from the data test means 12, before the input of the data test means 12. In the present case, the start inhibit means 29 are formed by parts of the data test means 12, namely by the controllable input used as reception inhibit means 27, and by the data test means 12 themselves, since the reception inhibit means 27 are adapted to cooperate with the data error signal DE, which can be generated by the data test means 12. Thus, it is advantageously achieved that the data test means 12 can decide autonomously on the reception of the useful data start signal SOF.

Figure 5:
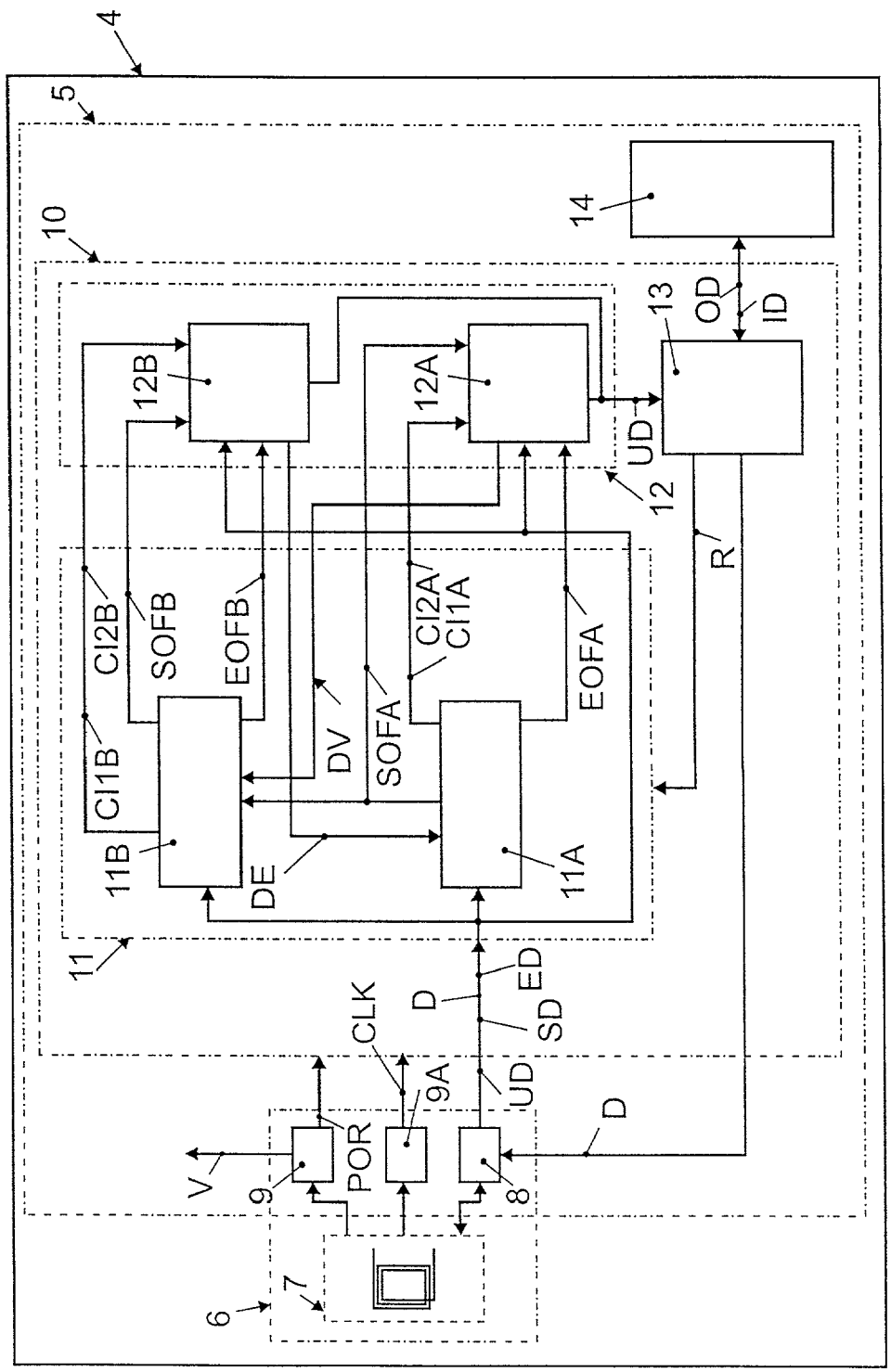
FIG. 5 shows, in a manner similar to FIG. 1, a data carrier and a circuit for a data carrier in a fifth embodiment of the invention.

FIG. 5 shows a block diagram of a data carrier 4 similar to the data carrier 4 shown in FIG. 1. In contradistinction to the data carrier 4 shown in FIG. 1 the data carrier 4 shown in FIG. 5 does not include decision means 21.

In the present case, the delimiter data detection means 11 are formed with the aid of first delimiter data detection means 11A and second delimiter data detection means 11B. The first delimiter data detection means 11A and the second delimiter data detection means 11B each include a useful data start detection means 15 and a useful data end detection means 16, shown in FIG. 1. The delimiter data detection means 11 can be started with the aid of the power-on reset signal POR or with the aid of the ready-to-receive signal R.

Furthermore, the data test means 12 in the present case are formed with the aid of first data test means 12A and with the aid of second data test means 12B.

After a start of the delimiter data detection means 11 the first delimiter data detection means 11A are adapted to detect the SOF delimiter data SD of a data block and to generate a first useful data start signal SOFA. This first useful data start signal SOFA can be supplied to the second delimiter data detection means 11B and to the first data test means 12A by the first delimiter data detection means 11A. Furthermore, the first delimiter data detection means 11A are adapted to detect the coding type of the data D during the detection of the SOF delimiter data SD, while upon detection of the first coding type first coding information CI1A can be supplied to the data test means 12A and upon detection of the second coding type second coding information CI2A can be supplied to the first data test means 12A. Furthermore, the first delimiter data detection means 11A can generate a first useful data end signal EOFA and supply this to the first data test means 12A upon detection of the EOF delimiter data ED. The first delimiter data detection means 11A are configured in such a manner that they activate the detection of the SOF delimiter data SD after the detection of the SOF delimiter data SD and the supply of the first useful data start signal SOFA and the first coding information CI1A or the second coding information CI2A.

The first data test means 12A, in contradistinction to the data test means 12 of the data carrier 4 shown in FIG. 1, are adapted to supply a data validity signal DV during the test of the data D for data errors, which data validity signal DV can be generated and supplied to the second delimiter data detection means 11B after termination of the test of the data for data errors and in the absence of data errors.

The second delimiter data detection means 11B can be started with the aid of the first useful data start signal SOFA. Accordingly, the started second delimiter data detection means 11B are adapted to continually re-detect the SOF delimiter data SD of a data block after the supply of the useful data start signal SOFA and to generate and supply a second useful data start signal SOFB. Accordingly, the re-detection of the SOF delimiter data SD is effected parallel in time with the test of the data D for data errors with the aid of the first data test means 12A. During the detection of the SOF delimiter data SD the second delimiter data detection means 11B, like the first delimiter data detection means 11A, are adapted to detect the coding type of the data D, while in the present case third coding information CI1B can be generated upon detection of the first coding type and fourth coding information CI2B can be generated upon detection of the second coding type. Furthermore, the second delimiter data detection means 11B, like the first delimiter data detection means 11A, are adapted to detect the EOF delimiter data ED and to generate a second useful data end signal EOFB. The second useful data start signal SOFB, the third coding information CI1B, the fourth coding information CI2B and the second useful data end signal EOFB can be applied to the second data test means 12B by the second delimiter data detection means 11B. After the re-detection of the SOF delimiter data SD the second delimiter data detection means 11B activate the detection of the SOF delimiter data SD.

In the second data test means 12B, similarly to the first data test means 12A, testing the data D for data errors can be started with the aid of the second useful data start signal SOFB and in accordance with the third coding information CI1B or the fourth coding information CI2B. When a data error appears the second data test means 12B, similarly to the data test means 12 shown in FIG. 1, can generate the data error signal DE. In the present case, the data error signal DE can be applied to the first delimiter data detection means 11A.

The first data test means 12A and the second data test means 12B are adapted to supply the useful data UD to the useful data processing means 13 each time that no data error is detected, i.e. in the case of valid useful data UD.

The cooperation between the delimiter data detection means 11 and the data test means 12 will now be explained hereinafter. The delimiter data detection means 11 can basically be started by the appearance of the power-on reset signal. As a matter of fact, this starts the detection of the SOF delimiter data SD in the first delimiter data detection means 11A. After the detection of the SOF delimiter data SD the first useful data start signal SOFA causes, on the one hand, the testing of the data D for data errors by the first data test means 12A to be started and, on the other hand, the re-detection of the SOF delimiter data SD by the second delimiter data detection means 11B to be started.

In the case that the first data test means 12A detect a data error in the data D the first data test means do not supply any useful data to the useful data processing means 13. Moreover, no data validity signal DV is supplied to the second delimiter data detection means 11B. The first data test means 12A merely activate the testing of the data D for data errors.

In the case that during testing of the data D for data errors the first data test means 12A do not detect any data errors the first data test means 12A supply the data validity signal DV to the second delimiter data detection means 11B upon termination of the test, as a result of which the re-detection of the SOF delimiter data SD in the second delimiter data detection means 11B is activated. The first data test means 12A supply the useful data UD to the useful data processing means 13.

In the case of a data error during testing of the data D with the aid of the first data test means 12A there has obviously been an incorrect synchronization of the data carrier 4 with the stream of received data D with the aid of the first delimiter data detection means 11A. During a re-detection of the SOF delimiter data SD with the aid of the second delimiter data detection means 11B a new test of the data D for data errors is now started in the second data test means 12B with the aid of the useful data start signal SOFB and in accordance with the third coding information CI1B or the fourth coding information CI2B.

In the case that a data error is detected during testing of the data D for data errors with the aid of the second data test means 12B the test with the aid of the second data test means 12B is activated. Furthermore, the second data test means 12B do not supply useful data UD to the useful data processing means 13. However, by means of the data error signal DE the second data test means 12B start a completely new synchronization of the data carrier 4 with the stream of received data D with the aid of the first delimiter data detection means 11A.

In the case that no data error is detected during testing of the data D for data errors with the aid of the second data test means 12B the second data test means 12B is activated. Furthermore, the second data test means 12B supply the useful data UD to the useful data processing means 13. Testing with the aid of the second data test means 12B is activated.

As soon as the data test means 12 supply the useful data UD to the useful data processing means 13 a completely new synchronization of the data carrier 4 with the stream of received data DE can be started either by the appearance of the ready-to-receive signal R or by the appearance of the power-on reset signal POR.

Figure 6:
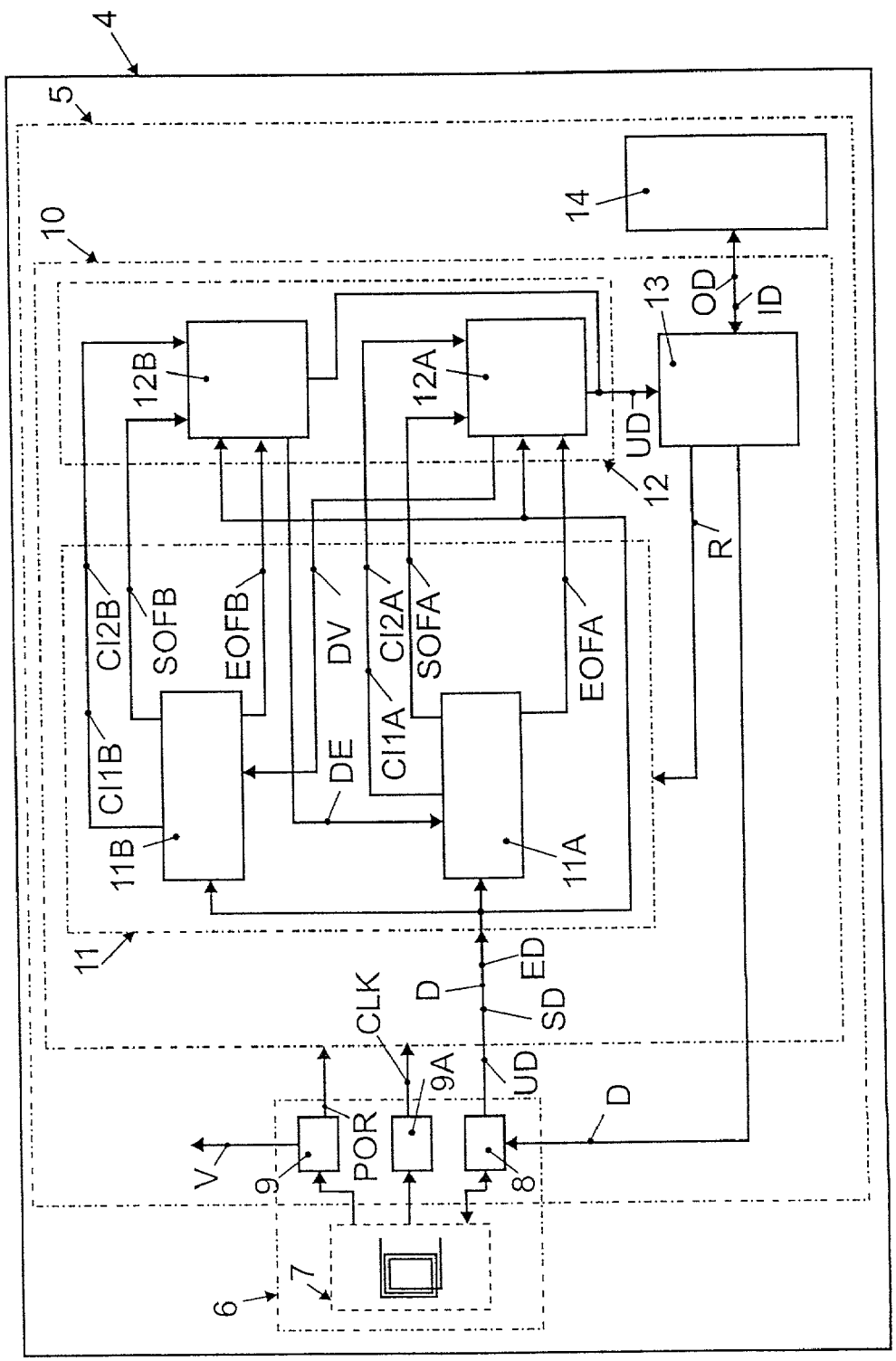
FIG. 6 shows, in a manner similar to FIG. 1, a data carrier and a circuit for a data carrier in a sixth embodiment of the invention.

FIG. 6 shows a block diagram of a data carrier 4 similar to the data carrier 4 shown in FIG. 1. Similarly to the data carrier 4 shown in FIG. 5, the delimiter data detection means 11 in the data carrier 4 of FIG. 6 are also formed by first delimiter data detection means 11A and second delimiter data detection means 11B. Likewise, the data test means 12 are formed by first data test means 12A and second data test means 12B. As regards their designs and their functions the first delimiter data detection means 11A, the first data test means 12A and the second data test means 12B are identical to, respectively, the first delimiter data detection means 11A, the first data test means 12A and the second data test means 12B shown in FIG. 5. In contradistinction to the second delimiter data detection means 11B of the data carrier 4 shown in FIG. 5 the second delimiter data detection means 11B of the data carrier 4 shown in FIG. 6 cannot be started with the aid of the first useful data start signal SOFA.

In order to guarantee in the present case the re-detection of the SOF delimiter data SD with the aid of the second delimiter data detection means 11B after the supply of the first useful data start signal SOFA to the first data test means 12A by the first delimiter data detection means 11A, the second delimiter data detection means 11B are adapted in such a manner that the re-detection of the SOF delimiter data SD is started simultaneously with the detection of the SOF delimiter data SD with the aid of the first delimiter data detection means 11A. The second delimiter data detection means 11B include delimiter data counting means, not shown in FIG. 6, which are adapted to count the SOF delimiter data SD detected with the aid of the second delimiter data detection means 11B. In the present situation, the second delimiter data detection means 11B are configured in such a manner that the second delimiter data detection means 11B are adapted to supply the second useful data start signal SOFB only when the delimiter data counting means have counted two SOF delimiter data SD detected with the aid of the second delimiter data detection means 11B.

The further cooperation of the delimiter data detection means 11 and the data test means 12 is identical to the cooperation between the delimiter data detection means 11 and the data test means 12 shown in FIG. 5 as described with reference to FIG. 5.

It is to be noted that the second delimiter data detection means 11B are realized with the aid of a series arrangement of a first delimiter data detection stage, not shown in FIG. 6, and a second delimiter data detection stage, neither shown in FIG. 6, the first delimiter data detection stage and the second delimiter data detection stage being adapted to detect the SOF delimiter data SD and at least the second delimiter data detection stage being adapted to detect the EOF delimiter data ED. The first delimiter data detection stage is adapted to be started simultaneously with the first delimiter data detection means 11A. Upon a detection of the SOF delimiter data SD the first delimiter data detection stage can generate a useful data start sub-signal simultaneously with the first useful data start signal SOFA and supply this to the second delimiter data detection stage. The second delimiter data detection stage is adapted to be started with the aid of the useful data start sub-signal, which guarantees the continual re-detection of the delimiter data SD of a data block. Upon a re-detection of the SOF delimiter data SD the second delimiter data detection stage is adapted to generate and to supply the second useful data start signal SOFB.

It is to be noted that parts of the data processing means 10 may be formed by a microprocessor by means of which program steps can be carried out for the purpose of realizing the technical means of the data carrier 4 in accordance with the invention and its circuit 5.

It is to be noted that, as regards the data processing means 10, which are basically formed with the aid of a microprocessor, the supply inhibit means 26 may be realized as part of a software routine.

Moreover, it is to be noted that, as regards the data processing means 10, which are basically formed with the aid of a microprocessor, the reception inhibit means 27 may be realized as part of a software routine.

Furthermore, it is to be noted that, as regards the data processing means 10, which are basically formed with the aid of a microprocessor, the delimiter data detection means 11, which are adapted to effect continual re-detection, and particularly the useful data start detection means 15 are realized as a first software routine, which first software routine can be carried out on the microprocessor parallel in time with a second software routine with the aid of which the data test means are formed.

It is to be noted that the data carrier 4 may have a contact-bound interface in addition to the contactless interface.

As regards the contact-bound interface it is to be noted also that during a communication of the data D with the aid of the contact-bound interface a second communication protocol may be used.

It is to be noted that a second communication protocol may also be used in the case of a data carrier 4 having only a contactless interface 6.

It is to be noted that the data test means 12 may also be configured in such a manner that, in the case of error-free useful data UD, the useful data UD may also be supplied without the useful data end signal EOF being received with the aid of the data test means 12. Data test means 12 which are thus configured make it possible to dispense with the useful data end detection means 16.

It is to be noted that the voltage generator 9 may take the form of a battery or may be realized with the aid of at least one solar cell. Furthermore, it is to be noted that the clock generation means 9A may alternatively be realized with the aid of an oscillator. Accordingly, the voltage generator 9 and the clock generation means 9A need not form circuit parts of the interface 6.

The invention claimed is:

1. A data carrier having an electric circuit,
which includes circuit parts of at least one interface, which circuit parts are adapted to receive data in the form of data blocks, each data block including delimiter data and useful data, and
which includes delimiter data detection means, which are adapted to detect delimiter data of a data block and to generate and to supply at least one useful data start signal, which at least one useful data start signal can be generated and supplied upon detection of the delimiter data, and
which includes data test means, which are adapted to test the data for data errors, characterized in that the delimiter data detection means are adapted to continually re-detect the delimiter data of a data block and to generate and to supply the useful data start signal also after the supply of the useful data start signal, wherein the data carrier is configured for inductive coupling with a second device when placed within a predetermined, contactless distance of the second device, the second device supplying power for operation of the electric circuit.

2. A data carrier as claimed in claim 1, characterized in that decision means are provided, which during testing with the aid of the data test means are adapted to decide on the basis of at least one decision criterion whether the re-detection of the delimiter data can be terminated, and after fulfillment of the decision criterion the delimiter data detection means are adapted to terminate the detection of the delimiter data.

3. A data carrier as claimed in claim 2, characterized in that delimiter data counting means are provided, which are adapted to count the re-detected delimiter data and to supply a delimiter data count, which delimiter data count represents a number of counted re-detected delimiter data, and the decision criterion is formed by the delimiter data count represented by the number "1".

4. A data carrier as claimed in claim 3, characterized in that the decision means form parts of the delimiter data detection means.

5. A data carrier as claimed in claim 2, characterized in that useful data pulse counting means are provided, which are adapted to count pulses included in the useful data and to supply a useful data pulse count, which useful data pulse count represents a number of pulses counted, and a first decision criterion is formed by the useful data pulse count represented by the number "2".

6. A data carrier as claimed in claim 5, characterized in that useful data time measurement means are provided, which when the useful data pulse count is represented by the number "1", the useful data time measurement means is adapted to measure a useful data time interval and to generate a useful data time measurement value, which useful data time measurement value represents the measured useful data time interval, and a second decision criterion is formed by the useful data pulse count represented by the number "1" and by the useful data time measurement value, which represents the measured useful data time interval and which corresponds to a time interval typical of the reception of the delimiter data.

7. A data carrier as claimed in claim 6, characterized in that the decision means are formed with the aid of parts of the delimiter data detection means.

8. A data carrier as claimed in claim 1, characterized in that start inhibit means for the data test means are provided, which inhibit means are adapted to receive a data error signal which can be supplied by the data test means, the data error signal enabling a data error to be signaled during the test of the data for data errors, and in the absence of the data error signal being adapted to inhibit the start of the test of the data for data errors with the aid of the data test means.

9. A data carrier as claimed in claim 8, characterized in that the start inhibit means are formed with the aid of supply inhibit means which are adapted to inhibit, in the absence of the data error signal, a useful data start signal which can be supplied substantially directly after the test.

10. A data carrier as claimed in claim 8, characterized in that the start inhibit means are formed with the aid of parts of the delimiter data detection means and the data test means.

11. A data carrier as claimed in claim 8, characterized in that the start inhibit means are formed with the aid of reception inhibit means which are adapted to inhibit, in the absence of the data error signal, a useful data start signal which can be received substantially directly after the test.

12. A data carrier as claimed in claim 8, characterized in that the start inhibit means form parts of the data test means.

13. A data carrier as claimed in claim 1, characterized in that the circuit takes the form of an integrated circuit.

14. A circuit for a data carrier,
which includes circuit parts of at least one interface, which circuit parts are adapted to receive data in the form of data blocks, each data block including delimiter data and useful data, and
which includes delimiter data detection means, which are adapted to detect delimiter data of a data block and to generate and to supply at least one useful data start signal, which at least one useful data start signal can be generated and supplied upon detection of the delimiter data, and
which includes data test means, which are adapted to test the data for data errors, characterized in that the delimiter data detection means are adapted to continually re-detect the delimiter data of a data block and to generate and to supply the useful data start signal also after the supply of the useful data start signal,
characterized in that decision means are provided, which during testing with the aid of the data test means are adapted to decide on the basis of at least one decision criterion whether the re-detection of the delimiter data can be terminated, and after fulfillment of the decision criterion the delimiter data detection means are adapted to terminate the detection of the delimiter data.

15. A circuit as claimed in claim 14, characterized in that delimiter data counting means are provided, which are adapted to count the re-detected delimiter data and to supply a delimiter data count, which delimiter data count represents a number of counted re-detected delimiter data, and the decision criterion is formed by the delimiter data count represented by the number "1".

16. A circuit as claimed in claim 15, characterized in that the decision means form parts of the delimiter data detection means.

17. A circuit as claimed in claim 14, characterized in that useful data pulse counting means are provided, which are adapted to count pulses included in the useful data and to supply a useful data pulse count, which useful data pulse count represents a number of pulses counted, and a first decision criterion is formed by the useful data pulse count represented by the number "2".

18. A circuit as claimed in claim 17, characterized in that useful data time measurement means are provided, which when the useful data pulse count is represented by the number "1", the useful data time measurement means is adapted to measure a useful data time interval and to generate a useful data time measurement value, which useful data time measurement value represents the measured useful data time interval, and a second decision criterion is formed by the useful data pulse count represented by the number "1" and by the useful data time measurement value, which represents the measured useful data time interval and which corresponds to a time interval typical of the reception of the delimiter data.

19. A circuit as claimed in claim 18, characterized in that the decision means are formed with the aid of parts of the delimiter data detection means.

20. A circuit as claimed in claim 14, characterized in that start inhibit means for the data test means are provided, which inhibit means are adapted to receive a data error signal which can be supplied by the data test means, the data error signal enabling a data error to be signaled during the test of the data for data errors, and in the absence of the data error signal being adapted to inhibit the start of the test of the data for data errors with the aid of the data test means.

21. A circuit as claimed in claim 20, characterized in that the start inhibit means are formed with the aid of supply inhibit means which are adapted to inhibit, in the absence of the data error signal, a useful data start signal which can be supplied substantially directly after the test.

22. A circuit as claimed in claim 20, characterized in that the start inhibit means are formed with the aid of parts of the delimiter data detection means and the data test means.

23. A circuit as claimed in claim 20, characterized in that the start inhibit means form parts of the data test means.

24. A circuit as claimed in claim 20, characterized in that the start inhibit means are formed with the aid of reception inhibit means which are adapted to inhibit, in the absence of the data error signal, a useful data start signal which can be received substantially directly after the test.

25. A circuit as claimed in claim 14, characterized in that the circuit takes the form of an integrated circuit.

* * * * *